(12) United States Patent
Hatke et al.

(10) Patent No.: US 6,551,653 B1
(45) Date of Patent: *Apr. 22, 2003

(54) METALIZED POLYOLEFIN FILM

(75) Inventors: Wilfried Hatke, Hofheim (DE); Karl-Heinz Kochem, St. Ingbert (DE); Theo Grosse Kreul, Wiesbaden (DE)

(73) Assignee: Ticona GmbH, Kelsterbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,391

(22) Filed: Oct. 18, 1996

(30) Foreign Application Priority Data

Oct. 20, 1995 (DE) ........................................ 195 39 093

(51) Int. Cl.[7] ............................. B05D 3/02; C23C 14/12; C23C 14/00
(52) U.S. Cl. ...................... 427/171; 427/314; 427/250; 427/525; 427/531; 427/566; 204/192.14; 204/192.17
(58) Field of Search ................................. 428/457, 461, 428/500, 337; 526/348.1, 281, 308, 348, 348.2; 427/250, 566, 525, 551, 171, 314; 204/192.15, 192.17, 192.14; 264/211.12

(56) References Cited

U.S. PATENT DOCUMENTS

| | | | | |
|---|---|---|---|---|
| 3,900,775 A | | 8/1975 | Takashima et al. ......... 317/258 |
| 3,939,129 A | * | 2/1976 | Marie ........................ 260/79.7 |
| 4,614,778 A | | 9/1986 | Kajiura et al. ............... 526/281 |
| 5,003,019 A | | 3/1991 | Ishimaru et al. ............. 526/281 |
| 5,008,356 A | | 4/1991 | Ishimaru et al. ............. 526/281 |
| 5,087,677 A | | 2/1992 | Brekner et al. .............. 526/160 |
| 5,218,049 A | | 6/1993 | Yamamoto et al. ........... 525/97 |
| 5,223,311 A | * | 6/1993 | Tsutsumi et al. ......... 427/388.1 |
| 5,324,801 A | | 6/1994 | Brekner et al. .............. 526/160 |
| 5,371,158 A | | 12/1994 | Brekner et al. .............. 526/127 |
| 5,534,606 A | | 7/1996 | Bennett et al. .............. 526/281 |
| 5,552,504 A | | 9/1996 | Bennett et al. ........... 526/348.1 |
| 5,610,253 A | * | 3/1997 | Hatke et al. ................. 526/281 |
| 5,625,527 A | * | 4/1997 | Hatada ........................ 361/273 |

FOREIGN PATENT DOCUMENTS

| | | | |
|---|---|---|---|
| CA | 2115195 | * | 8/1994 |
| DE | 28 02 769 | | 7/1979 |
| DE | 224 538 | | 7/1985 |
| DE | 109 224 | | 7/1986 |
| DE | 109224 | | 7/1986 |
| DE | 237 070 | | 7/1986 |
| DE | 241 971 | | 1/1987 |
| EP | 0 156 464 | | 1/1985 |
| EP | 0 156 464 | | 10/1985 |
| EP | 0 283 164 | | 9/1988 |
| EP | 0 384 694 | | 8/1990 |
| EP | 0 407 870 | | 1/1991 |
| EP | 0 485 893 | | 5/1992 |
| EP | 0 503 422 | | 9/1992 |
| EP | 0 610 814 | | 8/1994 |
| EP | 0 610 815 | | 8/1994 |
| EP | 0 610 816 | | 8/1994 |
| JP | 7-5224 | * | 2/1995 |

OTHER PUBLICATIONS

European Search Report for foreign counterpart application No. EP 96 11 6214 (Dec. 28, 1998).
Derwent WPAT English Abstract for DD 241 971 (Jan. 7, 1987). See AI.
Derwent WPAT English Abstract for JP 07 050 224 (Feb. 21, 1995). See AT.
EPO Patent Abstracts of Japan for JP 07 050 224 (Feb. 21, 1995). See AS.
Derwent WPAT English Abstract for JP 070 86088 (Mar. 3, 1995). See AV.
EPO Patent Abstracts of Japan for JP 070 86088 (Mar. 3, 1995). See AU.
Derwent WPAT English Abstract for DD 241 971 (Jan. 7, 1987). See BF.
Derwent WPAT English Abstract for JP 07 050 224 (Feb. 21, 1995). See BS.
EPO Patent Abstracts of Japan for JP 07 050 224 (Feb. 21, 1995). See BR.
Derwent WPAT English Abstract for JP 070 86088 (Mar. 3, 1995). See BU.
EPO Patent Abstracts of Japan for JP 070 86088 (Mar. 3, 1995). See BT.

* cited by examiner

Primary Examiner—Holly Rickman
(74) Attorney, Agent, or Firm—Connolly Bove Lodge & Hutz LLP

(57) ABSTRACT

This invention relates to a process for metalizing polyolefin film in which at least one outermost layer of the unmetalized polyolefin film has at least about 90% cycloolefin polymer that has not been subjected to a process for increasing surface tension before metalization. The metalized films are useful as dielectrics in capacitors.

13 Claims, No Drawings

METALIZED POLYOLEFIN FILM

The invention relates to metalized, in particular two-sided-metalized films, which are highly suitable as dielectric in capacitors. The novel films are polyolefin films, to be precise made from cycloolefin polymers, which, surprisingly, should not be subjected to a process for increasing the surface tension or surface energy (such as corona treatment) before metalization, unlike the usual case for polyolefins.

For use of polymer films as dielectrics in capacitors, the dissipation factor tan δ, the heat resistance, i.e. the stability of the mechanical (for example shrinkage) and electrical film properties at elevated temperature, and the metalizability are of considerable importance.

Low dissipation factors are of particular interest in high-frequency alternating-current applications, since dissipation performance is also low at low tan δ. Increased dissipation performance—and thus increased tan δ—means warming, so that the heat resistance of the film material can ultimately be exceeded and the capacitor can be damaged or destroyed. Accordingly, an ideal capacitor dielectric has a low dissipation factor coupled with high heat resistance.

With respect to metalizability, it is known that polyester films are easier to metalize than polyolefin films, since the latter must be subjected to surface treatment before metalization in order to achieve adhesion of the metal to the film. Metalization of thin films for use in capacitors is the subject of intensive research efforts. There is a fundamental difference in this respect between the polyethylene terephthalate (PET) predominantly employed at present as dielectric and polypropylene (PP). Owing to the polar polymer structure, PET has a critical surface tension of about 43 mN/m, which is sufficient to ensure adhesion to the metal, for example aluminum. By contrast, the critical surface tension of polyolefin films is, at from 30 to 33 mN/m, in a range which is not sufficient to ensure adhesion to the vapor-deposited metal layer. For this reason, the surfaces of polyolefin films must be treated by various methods in order to increase the surface tension and to achieve wettability, bondability and metalizability.

The most frequently used method is treatment with a high-frequency alternating voltage (10–60 kHz, 10–20 kV), known as corona treatment. This allows the surface tension to be increased to up to 50 mN/m. In the case of polyolefin films, in particular biaxially oriented films made from polypropylene, surface tensions of from 36 to 42 mN/m are usually established by means of corona discharge. However, the disadvantages of corona treatment are that, for example, the surface tension is time-dependent, and that treatment results in the formation of low-molecular-weight fragments of the polymer chain which can result in weakening of the bond between the polymer surface and a vapor-deposited metal layer.

For economic reasons, it is desirable to construct a capacitor from a two-sided-metalized film and an unmetalized film. As described in U.S. Pat. No. 3,900,775 this is possible, for example, by using a two-sided-metalized polyethylene terephthalate film and an unmetalized polypropylene film. However, the disadvantage of this structure is the greatly increased tan δ value of polyethylene terephthalate compared with polypropylene. For reasons of the better dissipation factor, polyolefin films are preferred over polyester films in alternating current applications. However, economical production of polypropylene films vapor-deposited (metalized) on both sides is significantly more difficult and is hitherto not performed industrially. A problem is corona treatment which must be carried out on both sides of the film before metalization. The electrostatic charges arising mean that this results in sticking (blocking) of the film to the reel. The adhesion forces occurring during winding up in turn produce more charges, which prevent subsequent uniform vapor deposition with the metal. According to DE-A-28 02 769, this problem can be circumvented by dissipating the charge on the film before vapor deposition. However, this is again an additional process step and consequently an additional source of error and is therefore uneconomical.

There therefore continues to be a need for a metalizable, preferably two-sided-metalized polyolefin film in which the disadvantages of the prior art are avoided and which has a low dissipation factor and high heat resistance.

A further object of the present invention was to provide a process for the production of a metalized (if possible on both sides) polyolefin film which avoids the disadvantages of the prior art, in particular the additional process step for increasing the surface tension.

Surprisingly, it has now been found that, from the multiplicity of polyolefins, cycloolefin polymers—against all expectations—can be metalized without pretreatment which increases the surface tension.

Accordingly, the object set is achieved by a one- or two-sided-metalized, single- or multilayer polyolefin film in which at least one outermost layer of the unmetalized polyolefin film essentially consists of a cycloolefin polymer which has not been subjected to a process for increasing the surface tension before metalization.

'One- or two-sided-metalized' means that the film carries a metal layer on one or both surfaces.

Single- or multilayer means that the unmetalized film is either a monofilm, i.e. consisting of only one layer, or is a multilayer structure and accordingly can be constructed from two, three, four, five or even more layers. It is essential to the invention here that the monofilm or at least one outermost layer of the multilayer film essentially consists of a cycloolefin polymer.

The expression 'essentially consists of a cycloolefin polymer' means that the monofilm or at least one outermost layer of the multilayer film consists of at least 90–100% by weight, preferably at least 95–100% by weight, in particular at least 98–99% by weight (based on the weight of the monofilm or the outermost layer of the multilayer film) of cycloolefin polymer. If desired, the single-layer film or the outermost layer may additionally include additives which are usually employed in the production of films.

The expression 'not subjected to any process for increasing the surface tension before metalization' means that the film is not subjected to additional treatment resulting in an increase in the surface tension after its conventional production process, which usually involves extrusion, stretching and heat-setting. This is taken to mean conventional processes, such as corona or flame treatment. It is essential to the invention that the metalization can take place without the film having been subjected beforehand to such a process.

Cycloolefin polymers are materials which are distinguished by high heat deflection temperatures, high moduli of elasticity, low water absorption and good dielectric properties.

DD-A-224 538 describes the production of films from norbornene-ethylene copolymers by a film casting process. The production of cycloolefin polymer films by melt extrusion is described in EP-A0 384 694, EP-A0 610 814, EP-A-0 610 815 and EP-A-0 610 816. The improvement in the mechanical properties of the films by monoaxial or biaxial stretching is likewise described in these specifications.

DD-241 971 and DD-224538 state that films made from cycloolefin polymers are distinguished by low dissipation factors (tan δ). The values given for tan δ of up to $1{,}2 \cdot 10^{-5}$ are below the values found for polymer materials used, in accordance with the current prior art, as dielectrics in capacitors. Only polystyrene has similar low values. As further stated in DD-241 971, low values of tan δ are of particular interest for high-frequency alternating-current applications, since electrical dissipation in the film can result in warming. The combination of high heat resistance (stability of the mechanical and electrical properties of the film at elevated temperatures) and low tan δ makes cycloolefin polymers highly suitable as films for capacitors which can be employed at high temperatures and high frequencies. Polystyrene-based films do not offer this advantage, since they begin to soften at temperatures as low as 90° C.

The combination of the abovementioned properties makes cycloolefin polymers suitable materials for use as dielectrics in alternating-voltage applications with high frequencies. In addition, these materials have very good constancy of the electrical properties up to temperatures just below the glass transition temperatures of the polymers. Cycloolefin polymers are therefore particularly suitable for use in capacitors subjected to an alternating electrical field at high frequencies and high temperatures.

Cycloolefin polymers can readily be converted into biaxially oriented films having good mechanical properties. The oriented films have moduli in the range from 2.7 to 4.0 GPa, tear strengths of from 80 to 150 MPa and elongations at break in the range from 5 to 100%. The surface tension of these films is in the range from 30 to 31 mN/m and is thus typical of polyolefin films. Likewise typical is that the polar component of the surface tension is very small. It was therefore to be expected that cycloolefin polymer films—like other polyolefin films—would not be metalizable without pretreatment in order to increase the surface tension. It was therefore all the more surprising that the cycloolefin copolymer films can be metalized at low surface tension without any pretreatment. This behavior is also substantially independent of the glass transition temperature of the cycloolefin polymer. This invention is particularly surprising since it has been found in further investigations that in order to be able to carry out printing of the film, a corona treatment is nevertheless necessary. As with other polyolefin films, the surface tension of the treated film increases on corona treatment. After corona treatment, the surface tension values obtained are typical of polyolefins.

The cycloolefin polymers which are suitable for the invention are polymers comprising from 0.1 to 100% by weight, preferably from 0.1 to 99% by weight, based on the total weight of the cycloolefin polymer, of polymerized units of at least one cyclic olefin of the formula I, II, III, IV, V or VI,

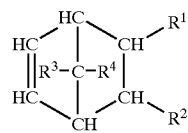
(I)

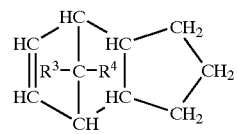
(II)

-continued

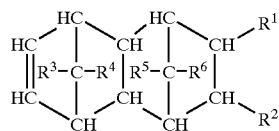
(III)

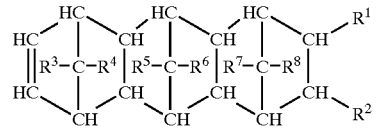
(IV)

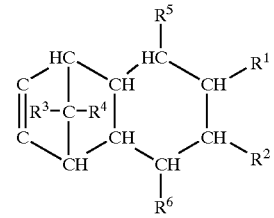
(V)

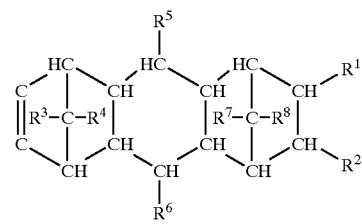
(VI)

in which $R^1$, $R^2$, $R^3$, $R^4$, $R^5$, $R^6$, $R^7$ and $R^8$ are identical or different and are a hydrogen atom or a $C_1$–$C_{30}$-hydrocarbon radical, for example a linear or branched $C_1$–$C_8$-alkyl radical, $C_6$–$C_{18}$-aryl radical, $C_7$–$C_{20}$-alkylenearyl radical or a cyclic $C_3$–$C_{20}$-alkyl radical or a cyclic $C_2$–$C_{20}$-alkyl radical, or two or more radicals $R^1$ to $R^8$ are connected to form a ring, it being possible for identical radicals in the various formulae to have different meanings, from 0 to 45% by weight, based on the total weight of the cycloolefin polymer, of polymerized units of at least one monocyclic olefin of the formula VII,

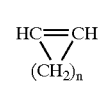
(VII)

in which n is a number from 2 to 10, from 0 to 99% by weight, based on the total weight of the cycloolefin polymer, of polymerized units of an a cyclic olefin of the formula VIII,

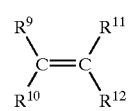
(VIII)

in which $R^9$, $R^{10}$, $R^{11}$, and $R^{12}$ are identical or different and are a hydrogen atom or $C_1$–$C_{10}$-hydrocarbon radical, for example a $C_1$–$C_8$-alkyl radical or $C_6$–$C_{14}$-aryl radical. Also suitable are cycloolefin polymers obtained by ring-opening polymerization of at least one of the monomers of the formulae I to VI followed by hydrogenation of the resultant products.

The cycloolefin polymers preferably contain polymerized units of at least one polycyclic olefin, in particular of the formula I or III, and of an a cyclic olefin of the formula VIII, which preferably has 2 to 20 carbon atoms, in particular ethylene.

Preference is given to cycloolefin polymers comprising polymerized units of the polycyclic olefins having a norbornene basic structure, particularly preferably norbornene or tetracyclododecene. Preference is also given to cycloolefin polymers comprising polymerized units of a cyclic olefins, such as α-olefins, particularly preferably ethylene. Particular preference is given to norbornene-ethylene and tetracyclododecene-ethylene copolymers.

The proportion of polymerized units of a cyclic olefins of the formula VIII is from 0 to 99% by weight, preferably from 5 to 80% by weight, particularly preferably from 10 to 60% by weight, based on the total weight of the cycloolefin polymer.

The cycloolefin polymers generally have glass transition temperatures of between −20° C. and 400° C., preferably between 50° C. and 200° C. The viscosity number (decalin, 135° C., DIN 53728) is generally between 0.1 and 200 ml/g, preferably between 50 and 150 ml/g.

The preparation of the cycloolefin polymers is carried out by heterogeneous or homogeneous catalysis by means of organometallic compounds and is described in a multiplicity of documents. Catalyst systems based on mixed catalysts comprising titanium or vanadium compounds in combination with organoaluminum compounds are described in DD 109 224, DD 237 070 and EP-A-0 156 464. EP-A-0 283 164, EP-A-0 407 870, EP-A-0 485 893 and EP-A-0 503 422 describe the preparation of cycloolefin polymers using catalysts based on soluble metallocene complexes. The cycloolefin polymer preparation processes described in these specifications are expressly incorporated herein by way of reference.

The cycloolefin polymer films used in accordance with the invention can include the conventional additives in film production, such as fine inert particles, which improve the slip and winding behavior. Such particles, which can be present in an amount of from 0 to 1%, are, for example: $SiO_2$, $Al_2O_3$, silicates having an $SiO_2$ content of at least 30% by weight, amorphous and crystalline clay minerals, alumosilicates, oxides of Mg, Zn, Zr and Ti, sulfates of Ca, Mg and Ba, phosphates of Li, Na and Ca (including the monohydrogen salts and dihydrogen salts), benzoates of Li, Na and K, terephthalates of Ca, Ba, Zn and Mn, titanates of Mg, Ca, Ba, Zn, Cd, Pb, Sr, Mn, Fe, Co and Ni, chromates of Ba and Pb, carbon (for example carbon black or graphite), glass (glass powder and glass beads), carbonate of Ca and Mg, fluorite, sulfides of Zn and Mo, organic polymer substances, such as polytetrafluoroethylene-polyethylene, talc, lithium fluoride, and the Ca, Ba, Zn and Mn salts of organic acids.

The film can also include suitable additives, for example stabilizers, neutralizers, lubricants or antioxidants. In principle, additives used for polyolefins, such as polyethylene or polypropylene, are also suitable for cycloolefin polymer films. Examples of UV stabilizers which can be used are absorbers, such as hydroxyphenylbenzotriazoles, hydroxybenzophenones, formamidine or benzylidenecamphor, quenchers, such as cinnamic esters or nickel chelates, free-radical scavengers, such as sterically hindered phenols, hydroperoxide scavengers, such as nickel or zinc complexes of sulfur-containing compounds, or light stabilizers of the HALS type, and mixtures thereof. Examples of suitable lubricants are: fatty acids and esters, amides and salts thereof, silicones or waxes, such as PP or PE waxes. Examples of antioxidants which can be added are free-radical scavengers, such as substituted phenols and aromatic amines, and/or peroxide scavengers, such as phosphites, phosphates and thio compounds.

The cycloolefin polymer films are produced in a conventional manner known to the person skilled in the art, for example by casting films from solution, extrusion from the melt using flat-film dies followed by monoaxial or biaxial stretching, extrusion from the melt using ring dies with subsequent stretching by means of a stream of air (film blowing). Preference is given to flat-film die extrusion with subsequent sequential biaxial orientation and heat setting. Here, the polymer is warmed and melted in an extruder and extruded through a flat-film die onto a chill roll; the resultant prefilm is usually then taken off from the chill roll and subsequently stretched biaxially, i.e. usually first in the machine direction and then in the transverse direction. This biaxial orientation is usually followed by heat setting, after which the film is wound up. In this process, the film can be extruded either as a monofilm or as a multilayer film, in which case at least one outermost layer essentially consists of cycloolefin polymers, as described above. The other layers of the multilayer film can likewise consist, for example, of cycloolefin polymers—where appropriate other than those used in the outer layer—or of other polymers, in particular polyolefins, such as polyethylene or polypropylene. In this way, it is possible to produce films having a thickness in the range from 2 to 50 μm, preferably from 3 to 30 μm.

The film produced in this way can then be provided with a metal layer without prior measures for increasing the surface energy, i.e., for example, without prior corona treatment. Examples of suitable metals are aluminum, zinc, mixtures of zinc and aluminum or silver. Preference is given to aluminum and zinc, and mixtures and/or alloys thereof. The metallization is carried out in a conventional manner customary to the person skilled in the art, for example by vacuum vapor deposition on the film. The advantage of the invention is that the cycloolefin polymer films can be metalized not only on one side, but also on both sides.

The metalized cycloolefin polymer films can be used to produce capacitors by conventional processes.

The invention is described in greater detail with reference to examples.

EXAMPLE 1

Preparation of a Norbornene/ethylene Polymer (COC-A)

A 1.5 dm³ reactor was charged with 1 liter of benzine fraction (boiling range from 90 to 110° C.) and 20 ml of a toluene solution of methylaluminoxane (10.1% by weight of methylaluminoxane having a molar mass of 1300 g/mol, according to cryoscopic determination), and the mixture was stirred at 70° C. for about 30 minutes in order to remove any impurities present. The solution was discharged, and the reactor was charged with 480 cm³ of an 85 per cent strength by weight solution of norbornene in toluene. The solution was saturated with ethylene by repeated injection of ethylene (6 bar gage), and subsequently 10 cm³ of the toluene solution of methylaluminoxane was introduced into the reactor and stirred at 70° C. for 5 minutes. A solution of 5.43 mg of isopropylene(1-cyclopentadienyl)(1-indenyl) zirconium dichloride in 10 cm³ of a toluene solution of methylaluminoxane was added after preactivation for 15 minutes.

The mixture was polymerized at 70° C. for 30 minutes with stirring (750 RPM), during which the ethylene pressure was kept topped up at 6 bar gage. The homogeneous reaction solution was discharged into a vessel and mixed with about 1 ml of water. A filtration aid was then added to the solution, and the mixture was filtered through a pressure filter. This solution was poured quickly into 5 dm$^3$ of acetone, and the mixture was stirred for 10 minutes and filtered. The resultant solid was washed with acetone. After filtration, the polymer was dried 15 hours at 80° C. under a pressure of 0.2 bar.

89.1 g of a colorless polymer were obtained. In order to determine the viscosity number, 0.1 g of the polymer was dissolved in 100 ml of decalin. The solution was measured at 135° C. in a capillary viscometer. The viscosity number was 56.5 dl/g. The glass transition temperature was determined from the second heating curve at a heating rate of 20° C./min in a Perkin Elmer DSC7 and was 175° C. The norbornene content was determined by $^{13}$C-nuclear magnetic resonance spectroscopy as being 58 mol%. The molecular weight of the polymer was determined by gel permeation chromatography at 135° C. The standards used were polyethylene fractions. The following values were found for the polymer:

$M_n$: 21500 g/mol $M_w$: 45000 g/mol $M_w/M_n$: 2.1.

Preparation of a Norbornene/ethylene Polymer (COC-B)

The polymerization was carried out as described above for COC-A. However, isopropylenebis(1-indenyl)zirconium dichloride was used as the metallocene catalyst, and the polymerization was carried out at a pressure of 20 bar gage. A random copolymer was obtained which had a norbornene content, determined by $^{13}$C-NMR, of 40 mol%, a glass transition temperature of 75° C. (DSC measurement) and a viscosity number of 120 ml/g (decalin, 135° C., 0.1 g/dl).

Preparation of a Norbornene/ethylene Polymer (COC-C)

The polymerization was carried out as described above for COC-A. However, isopropylenebis(1-indenyl)zirconium dichloride was used as the metallocene catalyst, and the polymerization was carried out at a pressure of 10 bar gage. A random copolymer was obtained which had a norbornene content, determined by $^{13}$C-NMR, of 53 mol%, a glass transition temperature of 140° C. (DSC measurement) and a viscosity number of 60 ml/g (decalin, 135° C., 0.1 g/dl).

Production of a Film (From COC-B)

COC-B was extruded at a temperature of 200° C. to give a film having a thickness of 400 µm and a width of 250 mm. Pieces measuring 200·200 mm were cut out of this film and simultaneously stretched longitudinally and transversely by a factor of 3.0 at 100° C. in a film stretching apparatus (Karo III from Brückner, Siegsdorf).

The resultant film has the following properties:

| | |
|---|---|
| Thickness: | 45 µm |
| Modulus of elasticity: | 2.9 GPa |
| Tear strength: | 80 MPa |
| Elongation at break: | 20% |
| Water vapor permeability (23° C., 85% relative humidity): | 0.6 g · 40 µm/m$^2$ · d |
| Surface tension: | 30 mN/m |

Production of a Film (From COC-C)

COC-C was extruded at a temperature of 240° C. to give a film having a thickness of 300 µm and a width of 250 mm. Pieces measuring 200·200 mm were cut out of this film and simultaneously stretched longitudinally and transversely by a factor of 3.0 at 155° C. in a film stretching apparatus (Karo III from Brückner, Siegsdorf).

The resultant film has the following properties:

| | |
|---|---|
| Thickness: | 35 µm |
| Modulus of elasticity: | 3.2 GPa |
| Tear strength: | 90 MPa |
| Elongation at break: | 50% |
| Water vapor permeability (23° C., 85% relative humidity): | 1 g · 40 µm/m$^2$ · d |
| Surface tension: | 29 mN/m |

Metalization of the Film

The films made from COC-B and COC-C were cut to DIN A4-sized pieces and vapor-deposited with aluminum on one and both sides without further surface treatment (metalization conditions: pressure 10$^{-5}$ mbar, time 11 min). The thickness of the vapor-deposited aluminum layer was about 40 nm.

The adhesion of the aluminum layer to the films was tested in accordance with ASTM D 3359, but without cross-hatching, by sticking on and rapidly removing an adhesive tape (Tesafilm TP 104). Aluminum could not be detached from either film on either vapor-deposited side.

The water vapor permeability (23° C., 85% rel. humidity) of the vapor-deposited films (made from COC-B) was then 0.5 g·40 µm/m$^2$·d for the film vapor-deposited on one side and 0.4 g·40 µm/m$^2$·d for the film vapor-deposited on both sides.

COMPARATIVE EXAMPLE

A biaxially oriented, non-corona-treated film made from highly isotactic polypropylene (Trespaphan PM A 10, manufacturer Hoechst, thickness 10 µm) was cut into DIN A4-sized samples analogously to Example 1 and vapor-deposited with aluminum on one side without any further surface treatment (experimental conditions analogous to Example 1). The surface tension on the side to be metalized was 31 mN/m before metalization. The thickness of the vapor-deposited aluminum layer was about 40 nm. The adhesion of the aluminum layer was tested as in Example 1. The aluminum could be detached completely from the film surface using the adhesive tape.

What is claimed is:

1. A process for preparing a metallized film, comprising:
   extruding a polymeric composition, essentially free of polyester, which comprises a cycloolefin polymer, to obtain a film structure,
   orienting the resulting film structure,
   metallizing a surface of the resulting oriented film structure without previously subjecting said surface to any process for increasing the surface tension of said surface.

2. A process as claimed in claim 1, which further comprises:
   heat-setting the oriented film structure and optionally winding up the resulting heat-set, oriented film structure, and
   providing the heat-set, oriented film structure with a metal layer on at least one surface of said structure.

3. A process as claimed in claim 1, wherein said film structure is a monofilm or a multilayer film.

4. A process for metalizing a film with a layer of metal comprising
   (a) extruding a polymeric composition, essentially free of polyester, which comprises at least 90% by weight of the polymeric composition of cycloolefin polymer, using flat-film dies to produce a polymeric film;
   (b) monoaxial or biaxial stretching of the polymeric film by means of a stream of air; and
   (c) metalizing a surface of the stretched polymeric film without previously subjecting the surface to any process for increasing the surface tension of the surface before metalization to produce a metalized film;
   wherein the layer of metal is adherently bonded with sufficient strength to the polymeric film to resist delamination in accordance with ASTM D 3359.

5. The process of claim 4 wherein the stretched polymeric film is metalized by vacuum vapor deposition of metal on the film.

6. The process of claim 4 wherein the metal is aluminum, zinc, or silver.

7. The process of claim 4, wherein the metal is aluminum, zinc, or mixtures or alloys of aluminum and zinc.

8. The process of claim 4, wherein the polymeric film consists essentially of a norbornene-ethylene copolymer.

9. The process of claim 4 that further comprises heat setting the stretched polymeric film before metalizing.

10. The process of claim 4 wherein the polymeric film prior to metalizing is a monolayer film.

11. The process of claim 4 wherein the polymeric film prior to metalizing is a multilayer film.

12. The process of claim 4 wherein the metalized film has a thickness of from 2 to 50 μm.

13. A process for metalizing a film with a layer of metal comprising
   (a) extruding a polymeric composition, essentially free of polyester, which comprises at least 90% by weight of the polymeric composition of cycloolefin polymer, the cycloolefin polymer comprising from 0.1 to 95% by weight, based on the total weight of the cycloolefin polymer, of polymerized units of at least one cyclic olefin of the formula I, II, III, IV, V or VI,

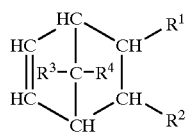
(I)

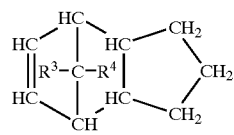
(II)

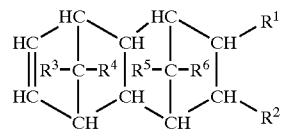
(III)

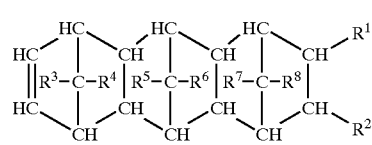
(IV)

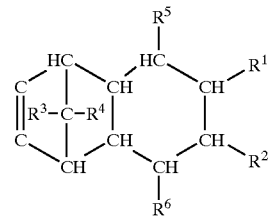
(V)

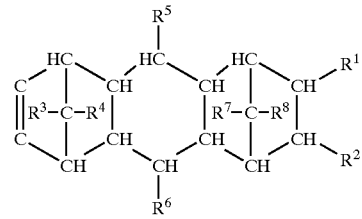
(VI)

in which, independently, throughout formulae I–VI, $R^1$, $R^2$, $R^3$, $R^4$, $R^5$, $R^6$, $R^7$ and $R^8$ are identical or different and are a hydrogen atom or a $C_1$–$C_{20}$ hydrocarbon radical, or two or more radicals $R^1$ to $R^8$ are connected to form a ring, from 0 to 45% by weight, based on the total weight of the cycloolefin polymer, of polymerized units of at least one monocyclic olefin of the formula VII,

(VII)

in which n is a number from 2 to 10, from 5 to 80% by weight, based on the total weight of the cycloolefin polymer, of polymerized units of an a cyclic olefin of the formula VIII,

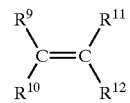
(VIII)

in which $R^9$, $R^{10}$, $R^{11}$ and $R^{12}$ are identical or different and are a hydrogen atom or $C_1$–$C_{10}$-hydrocarbon radical, using flat film dies to produce a polymeric film;

(b) monoaxial or biaxial stretching of the polymeric film by means of a stream of air; and (c) metalizing a surface of the stretched polymeric film without previously subjecting the surface to any process for increasing the surface tension of the surface before metalization to produce a metalized film, wherein the layer of metal is adherently bonded with sufficient strength to the polymeric film to resist delamination in accordance with ASTM D 3359.

* * * * *

UNITED STATES PATENT AND TRADEMARK OFFICE
CERTIFICATE OF CORRECTION

PATENT NO. : 6,551,653 B1
DATED : April 22, 2003
INVENTOR(S) : Wilfried Hatke et al.

It is certified that error appears in the above-identified patent and that said Letters Patent is hereby corrected as shown below:

<u>Column 10,</u>
Line 41, "a cyclic" should read -- acyclic --.

Signed and Sealed this

Fifteenth Day of July, 2003

JAMES E. ROGAN
*Director of the United States Patent and Trademark Office*